US010710003B2

(12) United States Patent
Tomar et al.

(10) Patent No.: US 10,710,003 B2
(45) Date of Patent: Jul. 14, 2020

(54) INDUCTION HEATER SYSTEM FOR A FLUIDIZED BED REACTOR (71) Applicant: Corner Star Limited, Kowloon (HK)

(72) Inventors: Vivek Tomar, Houston, TX (US); Puneet Gupta, Singapore (SG); Satish Bhusarapu, Sugarland, TX (US)

(73) Assignee: Corner Star Limited, Hong Kong (HK)

( * ) Notice: Subject to any disclaimer, the term of this patent is extended or adjusted under 35 U.S.C. 154(b) by 0 days.

(21) Appl. No.: 15/700,442

(22) Filed: Sep. 11, 2017

(65) Prior Publication Data

US 2017/0368475 A1 Dec. 28, 2017

Related U.S. Application Data (63) Continuation of application No. 14/301,968, filed on Jun. 11, 2014, now Pat. No. 9,789,421.

(51) Int. Cl.
*H05B 6/06* (2006.01)
*H05B 6/02* (2006.01)
(Continued)

(52) U.S. Cl.
CPC ............. *B01D 9/00* (2013.01); *B01J 8/0005* (2013.01); *B01J 8/1818* (2013.01); *B01J 8/1836* (2013.01);
(Continued)

(58) Field of Classification Search
CPC ...... B01J 8/1818; B01J 19/088; B01J 8/1836; B01J 8/0005; B01J 2208/00433; B01J 2208/00469; B01J 2208/00495; B01J 2208/0053; B01J 2219/0809; H05B 6/40; H05B 6/02; H05B 6/06; H05B 6/108; B01D 9/00; C01B 33/027
(Continued)

(56) References Cited

U.S. PATENT DOCUMENTS 5,260,538 A 11/1993 Clary et al.
6,127,004 A 10/2000 Hatwar et al.
(Continued)

FOREIGN PATENT DOCUMENTS

CN 2389714 Y 8/2008
CN 102205219 A 10/2011
(Continued)

OTHER PUBLICATIONS

International Search Report and Written Opinion of the International Searching Authority regarding PCT/US2015/035004 dated Nov. 4, 2015; 12 pgs.

*Primary Examiner* — Quang T Van
(74) *Attorney, Agent, or Firm* — Armstrong Teasdale LLP (57) ABSTRACT A system for the production of a polycrystalline silicon product is disclosed. The system includes a reaction chamber, a susceptor, an induction unit, and a plurality of energy sources. The reaction chamber has a reactor wall, and the susceptor encircles the reactor wall. The induction heater surrounds the susceptor, and has multiple induction coils for producing heat in the susceptor. The coils are grouped into a plurality of zones. The plurality of energy sources supply electric current to the coils. Each energy source is connected with the coils of at least one zone.

20 Claims, 4 Drawing Sheets (51) Int. Cl.
  *B01D 9/00* (2006.01)
  *B01J 8/18* (2006.01)
  *C01B 33/027* (2006.01)
  *H05B 6/10* (2006.01)
  *H05B 6/40* (2006.01)
  *B01J 8/00* (2006.01)
  *B01J 19/08* (2006.01)

(52) U.S. Cl.
  CPC ........... *B01J 19/088* (2013.01); *C01B 33/027* (2013.01); *H05B 6/02* (2013.01); *H05B 6/06* (2013.01); *H05B 6/108* (2013.01); *H05B 6/40* (2013.01); *B01J 2208/0053* (2013.01); *B01J 2208/00433* (2013.01); *B01J 2208/00469* (2013.01); *B01J 2208/00495* (2013.01); *B01J 2219/0809* (2013.01)

(58) Field of Classification Search
  USPC ........ 219/635, 628, 634, 647, 662; 373/146, 373/157, 138, 151, 152, 155, 156; 118/725; 423/249, 412, 659; 427/213, 427/215, 219; 442/146
  See application file for complete search history.

(56) References Cited

U.S. PATENT DOCUMENTS

| | | | |
|---|---|---|---|
| 2005/0199614 A1* | 9/2005 | Uchida | .............. A45D 20/12 |
| | | | 219/662 |
| 2009/0129429 A1 | 5/2009 | Fishman | |
| 2010/0051609 A1* | 3/2010 | Fishman | ............ C30B 11/003 |
| | | | 219/634 |
| 2010/0135888 A1 | 6/2010 | Fishman | |
| 2011/0248430 A1 | 10/2011 | Fishman | |

FOREIGN PATENT DOCUMENTS

| | | |
|---|---|---|
| CN | 103523786 A | 1/2014 |
| DE | 2539880 A1 | 3/1977 |
| WO | 9320933 A1 | 10/1993 |
| WO | 9903308 A1 | 1/1999 |

* cited by examiner

INDUCTION HEATER SYSTEM FOR A FLUIDIZED BED REACTOR

CROSS-REFERENCE TO RELATED APPLICATIONS

This application is a continuation of U.S. patent application Ser. No. 14/301,968, filed Jun. 11, 2014, which is incorporated herein by reference in its entirety.

FIELD

This disclosure generally relates to a fluidized bed reactor and, more specifically, to systems and methods for induction heating of the fluidized bed reactor.

BACKGROUND

Polysilicon is a raw material used to produce many products including, for example, semiconductor wafers used for integrated circuits and photovoltaic (i.e., solar) cells. Polysilicon is typically produced by a chemical vapor deposition mechanism in which silicon is deposited from a thermally decomposable silicon compound onto silicon seed particles or granular polysilicon in a fluidized bed reactor. During this deposition process, the temperature in the fluidized bed reactor affects gas density and viscosity, which affect the dynamics of the gas-solid system and resulting reaction kinetics. Therefore, heat is applied to the fluidized bed reactor to increase and maintain an elevated temperature for optimizing the production of polysilicon.

One method of controlling the temperature within the reactor has been to preheat the inlet gases, i.e. silane and the diluting gas, in a controlled manner before they enter the reactor. However, preheating the inlet gases causes premature decomposition of the silane, which results in deposition of silicon in the inlet. Therefore, the temperature within the reactor is generally controlled by heating the reactor walls in industrial applications to prevent the premature decomposition of the silane.

Induction heater systems have been used to elevate the temperature within the fluidized bed reactor by heating the reactor walls. Induction heater systems generally include an electrically conducting work head or coil and a conducting work piece or susceptor located around the reactor walls, inside the coils. An alternating electric current is passed through the coils to create a strong magnetic field around the work piece. The magnetic field produces electric currents, or eddy currents, in the conducting work piece, which generate heat in the work piece though resistive or joule heating. As the alternating electric current passes through the coils, the work piece generates heat and increases the temperature within the reactor walls. However, prior systems for induction heating of fluidized bed reactors have created hotspots within the reactor walls that decrease the lifespan of the fluidized bed reactor.

As a result, there remains a need for induction heater systems and methods that provide better control, e.g., to reduce hot spots within the reactor walls and extend the useful life of reactors.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A first aspect is a system for the production of a polycrystalline silicon product. The system includes a reaction chamber, a susceptor, an induction unit, and a plurality of energy sources. The reaction chamber has a reactor wall. The susceptor encircles the reactor wall. The induction heater surrounds the susceptor, and has multiple induction coils for producing heat in the susceptor. The coils are grouped into a plurality of zones. The plurality of energy sources supply electric current to the coils. Each energy source is connected with the coils of at least one zone.

A first aspect is a method for producing a polycrystalline silicon product in a reactor having multiple induction coils grouped into multiple zones and a plurality of energy sources and a susceptor. Each of the plurality of energy sources is connected with the coils of at least one zone. The method includes supplying an electric current from each energy source to the coils of at least one zone to create an electromagnetic field about the coils. The supply of electric current from each energy source is independent of alternating electric current from another energy source. The method also includes producing eddy currents in the susceptor, and generating heat in the susceptor.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the several views of the drawings.

DETAILED DESCRIPTION

The embodiments described herein generally relate to systems and methods for induction heating of fluidized bed reactors for the production of granular polycrystalline silicon (polysilicon). The process for polysilicon production using a fluidized bed reactor (FBR) includes decomposition of silane to silicon and hydrogen within the reactor, followed by chemical vapor deposition of the silicon on to silicon seed particles or granular polysilicon. The silicon may also be deposited on to the silicon seed particles through other reaction pathways.

To increase the production rates of polysilicon, larger fluidized bed reactors having reactor walls with increased diameters are operated at elevated pressures. These fluidized bed reactors may be operated at relatively high pressures above 1 barg, up to 10 barg or even as high as 20 barg. These are known as high pressure fluidized bed reactors (HP-FBR). The production rates can linearly increase with the operating pressure for a given size of high pressure fluidized bed reactor. However, these high pressure fluidized bed reactors require additional energy for maintaining higher temperatures, e.g., between 420° C. and 650° C., during this increased rate of production. For example, a high pressure fluidized bed reactor with a diameter of between 20-55 inches and an operational pressure of between 3-20 barg requires heat fluxes in the order of 50-150 KW/m².

Therefore, the applied heat must be controlled to maintain a precise temperature field inside the reactor wall, preventing hotspots in the reactor wall that decrease the lifespan of the reactor. As disclosed herein, heating of the reactor walls is controlled using a multi-zone induction heater system designed for precise temperature control along the length of the reactor wall.

Figure 1:
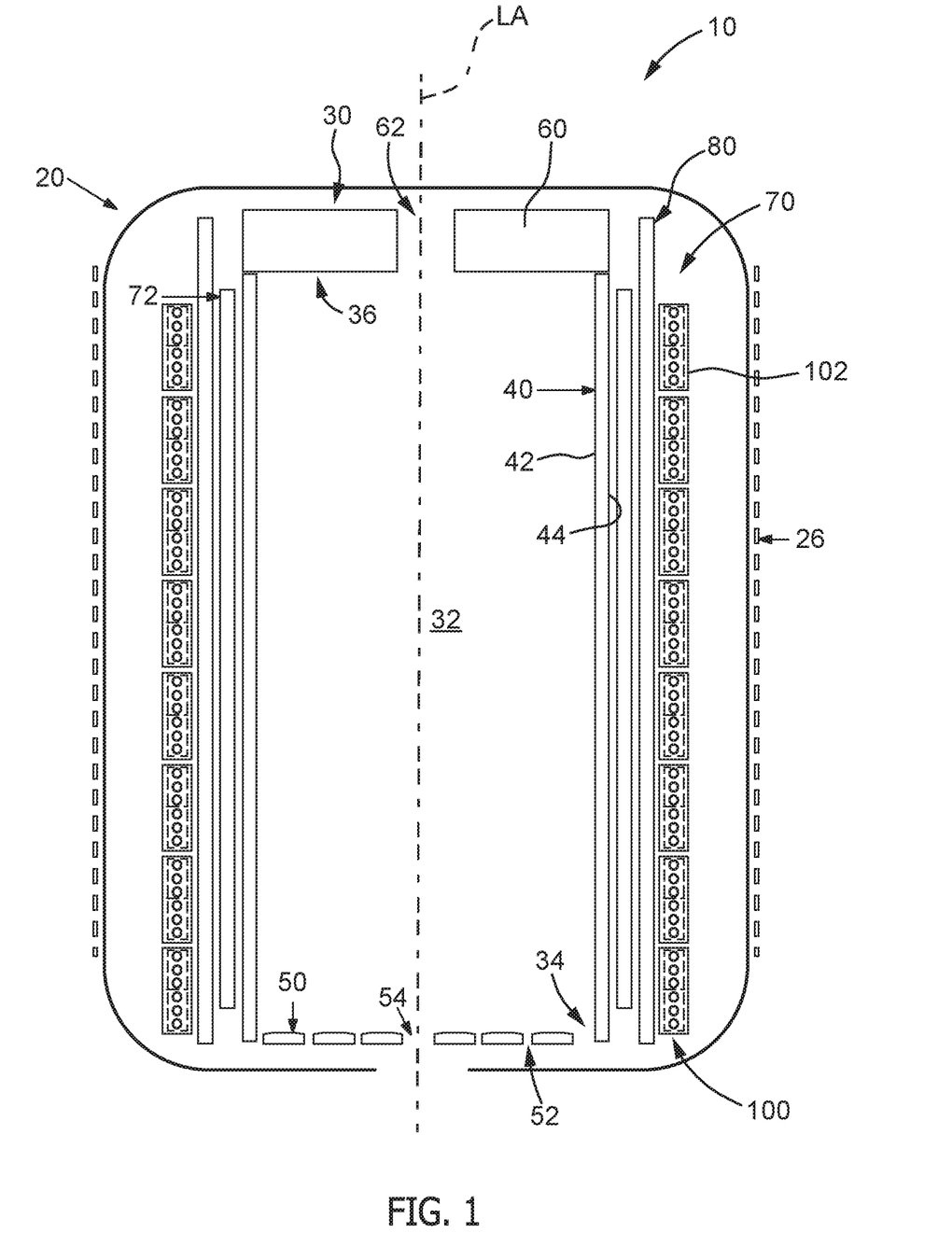
FIG. 1 is a cross-sectional view of an induction heater system in accordance with one embodiment.

A system for the production of polycrystalline silicon using a fluidized bed reactor operating at high pressure, a high-pressure fluidized bed reactor, having a high efficiency induction heater system is generally indicated at 10 and shown in FIG. 1. The system 10 includes an enclosure 20 surrounding the high-pressure fluidized bed reactor (reactor) 30 and an induction heater system 70 having a susceptor 72, an insulation body 80, and an induction unit 100. In some embodiments, the fluidized bed reactor 30 is a low pressure reactor and operates at or near atmospheric pressure, between 0 and 1 barg.

The fluidized bed reactor 30 includes a reaction chamber 32 enclosed by a reactor wall 40 having an inner surface 42 and an outer surface 44. The reaction chamber 32 defines a bottom 34, a top 36, and a longitudinal axis 'LA' extending therethrough. The reactor chamber 32 contains a fluidized bed of granular polysilicon for the chemical vapor deposition of silicon from the thermal decomposition silane.

The reactor wall 40 may be made of graphite, or other suitable material that provides high thermal conductivity for efficient operation, and have a non-contaminating coating or material, such as silicon, silicon carbide, or similar non-contaminating material, along the inner surface 42 to prevent contamination of the ultra-pure silicon in the reaction chamber 32.

In some embodiments, the reactor wall 40 may have a relatively large diameter of about 20 inches or more. In other embodiments, the diameter of the reactor wall 40 may be between 40 and 60 inches, or up to 150 inches.

The distributor 50 extends across the bottom 34 of the reaction chamber 32 to define a lower reaction chamber boundary. The distributor 50 has a plurality of openings 52 connected with one or more sources of gas that may include silane. The openings 52 provide and distribute the incoming gas(es) along the bottom 34 of the reaction chamber 32. The distributor 50 has a withdrawal tube 54 to remove the processed product or polysilicon from the reaction chamber 32.

A cap 60 closes the top 36 of the reaction chamber 32 to define an upper reaction chamber boundary. The cap 60 includes an outlet 62 for allowing exhaust gas to be evacuated from the reaction chamber 32. Either the cap 60 or reactor wall 40 may include an inlet (not shown) for supplying raw or unprocessed material, such as granular polysilicon, to the reaction chamber 32.

The outer surface 44 of the reactor wall 40 is surrounded by the outwardly spaced susceptor 90, which works with the induction unit 100 to create and supply heat to the reactor wall 40. The induction unit 100 maintains the temperature within the reaction chamber 32 between 420° C. and 650° C., above 450° C., between 450° C. and 500° C., or between 600° C. and 650° C. With additional reference to FIG. 2, the induction unit 100 is divided into heating zones 102 and sub-zones 104. Each sub-zone 104 includes a plurality of induction coils 110 precisely located in alignment with the longitudinal axis of the reaction chamber 32. The heating zones 102 are individually controllable to provide control of the axial temperature profile. The heating zones 102 allow the system 10 to be operated with different temperature profiles within the reaction chamber 32. In some embodiments, the lower or bottom portion of the reaction chamber 32 is maintained between 450° C. and 500° C., while the upper or top portion of the reaction chamber is maintained between 600° C. and 650° C.

As shown in FIG. 1, the induction unit 100 of this embodiment has eight zones 102. Each heating zone 102 is equivalent in height. In some embodiments, the number of zones and the height of each zone may vary according to the process requirements for which it is being used. For example, some embodiments may include more or less zones having differing heights. In other embodiments, the induction unit 100 may have between one and twenty zones.

Figure 2:
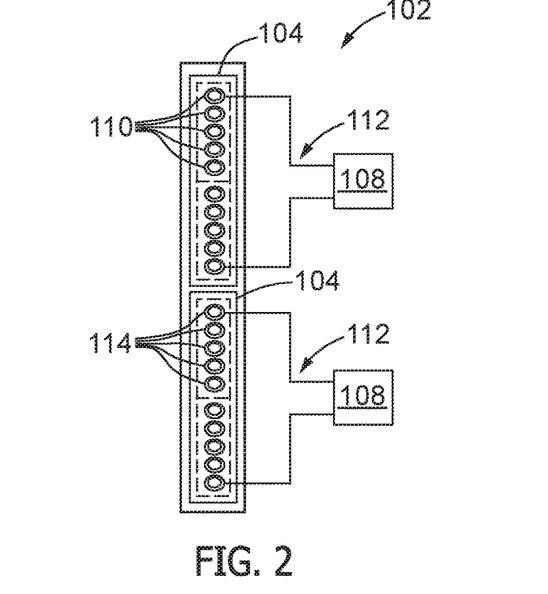
FIG. 2 is an enlarged view of a single controllable heating zone of the induction heater system of FIG. 1.

As shown in FIG. 2, each controllable heating zone 102 is divided into sub-zones 104 that are connected with an independent current or energy source 108. Each sub-zone 104 includes multiple induction coils 110. In this embodiment, each heating zone 102 is divided into two sub-zones 104 having three coils 110. The coils 110 of each sub-zone 104 are connected with the same independent energy source 108. In other embodiments, more or less, including one, sub-zones 104, energy sources 108, and induction coils 110 may be utilized. In these embodiments, the sub-zones 104 of a single zone 102 may be connected to the same or different energy sources 108. In still other embodiments, coils 110 from each sub-zone 104 may be connected with the same or different energy sources 108, providing equal or unequal currents to each of the sub-zones.

Each sub-zone 104 has a separate input/output connection 112 that connect the coils 110 with the energy source 108. Each energy source 108 is controlled to maintain an equal current supply across all induction coils 110 grouped together in the sub-zone 104.

The induction coil 110 carries alternating electric currents from the energy source 108. These alternating currents create an electromagnetic field that produces eddy currents in the susceptor 90, and not in the reactor wall 40, for heating the reaction chamber 32. In some embodiments, the electric current may be a DC or chopped DC current, e.g., at a frequency in the range of 1-20 KHz, or 2-4 KHz. The induction coils 110 are evenly distributed along the length of the induction unit 100 and susceptor 72 to form a uniform electromagnetic field along the longitudinal length of the susceptor for uniform heating of the reaction chamber 32. In some embodiments, the induction coils 110 are not evenly distributed. In these embodiments, the induction unit 100 may have higher concentration (more) induction coils 100 along a portion of its length and lower concentration (less) induction coils along another portion of its length.

The process of using the high-pressure fluidized bed reactor requires heat fluxes in a range of about 50 to about 150 KW/m$^2$. To achieve these heat fluxes, the alternating current ranges from about 100 to about 800 Amperes with a coil current density ranging from about 1e5 to about 1e8 A/m$^2$. In some embodiments, the alternating current ranges from about 1000 to about 3500 Amperes. These high current densities generate significant heat inside the induction coils and therefore, must be actively cooled. As disclosed herein, the temperature of the induction coils 110 are regulated by circulating cooling deionized water through passages 114 in the induction coils. In other embodiments, another suitable method for cooling the induction coils 110 may be used.

The susceptor 72 is a cylindrical tube that encircles the reactor wall 40. As discussed above, the uniform electromagnetic field produces electric currents, or eddy currents, in the susceptor 72, which generates heat though resistive or joule heating to heat the reactor wall 40 through radiation and convection. The majority of heat is provided from the susceptor 72 to the reactor wall 40 through radiation. The susceptor 72 is made from electrically and thermally conducting materials in order to achieve efficient heating. The operating temperature of the susceptor 72 may reach up to 1800° C. for very high heat fluxes. As a result, the susceptor 72 is able to withstand high temperatures for prolonged periods of time. Nuclear grade graphite is suitable material for the susceptor 72 since it has high thermal and electrical conductivity.

The susceptor 72 and reactor wall 40 are spaced from each other to allow for differences in coefficients of thermal expansion between the susceptor and reactor wall. This space also prevents heat from being transferred to the reactor wall through conduction. In some embodiments, the susceptor 72 is spaced from the reactor wall 40 between 0.03125 inches and 2 inches. A reduced space increases efficiency of the heat transfer, and an increased space allows for an increase in allowable tolerances and the resulting ease of manufacturing and installation.

A magnetic field that penetrates the reactor wall 40, or into the reaction chamber 32, produce eddy currents in the reactor wall that generate joule heating in the reactor wall. This may result in non-uniform heating of the reactor wall 40, hot spots, which reduce the lifespan of the reactor wall. Therefore, the susceptor 72 prevents or masks the magnetic field from producing eddy currents in the reactor wall 40. The thickness of the susceptor 72 determines the susceptor's ability to mask the magnetic field and prevent them from penetrating the reactor wall 40.

Over 95% of the heat generated in the reactor 30 is generated inside the susceptor 72, which is proportional to the thickness of the susceptor. However, increasing the thickness of the susceptor 72 also increases the temperature gradient across the susceptor 72 at the required high heat fluxes, which causes high thermal stresses. Therefore, the thickness of the susceptor 72 may be optimized for generating a higher percentage of heat in the susceptor while lowering thermal stresses. The optimum thickness of the susceptor 72 is dependent on the frequency of the current passing through the induction coils 110. A low frequency current of between about 500 and about 2000 Hz will require a thicker susceptor 72 and a high frequency current of between about 2000 and about 10000 Hz will require a thinner susceptor.

In some embodiment, the susceptor 72 has a thickness up to 6 inches. In other embodiments, the system 10 does not have a susceptor. In this embodiment, the heat is induced within the reactor wall 32. In another embodiment, a segmented susceptor and reactor wall may be used to reduce thermal stresses due to a steep axial temperature gradient.

The insulation body 80 is located between the susceptor 72 and the induction unit 100 to prevent heat loss from the susceptor to ambient and to improve the efficiency of the system 10. The insulation body 80 is spaced from the susceptor 72 and reactor wall 40 to allow for differences in coefficients of thermal expansion between them. The insulation body 80 is made of an electrically non-conducting material to prevent the production of significant eddy currents inside the insulation body, which would lead to heat generation.

Heat loss through the insulation body 80 is inversely proportional to the thickness of the insulation body. However, increasing the thickness of the insulation body 80 reduces the coupling between the induction coils 110 and the susceptor 72 by increasing the space between them. Thus, increasing the thickness of the insulation body reduces the efficiency of the system 10. As a result, the thickness of the insulation body 80 is optimized for minimizing heat loss through the insulation body while providing an efficient coupling between the induction coils 110 and susceptor 80. In some embodiments, the insulation body 80 has a thickness of between 0.5 inches and 8.0 inches.

The enclosure 20 is configured to contain the pressure used in high pressure operations and mask the stray magnetic field. The enclosure 20 is made of an electrically conducting material. Common metallic alloys, such as carbon steel and austenitic stainless steel, are suitable material for the enclosure 20. The magnetic field surrounding the induction coils 110 may generate weak to strong eddy currents in the enclosure 20 resulting in the production of heat within the enclosure. Therefore, the enclosure 20 may be externally cooled by being surrounded by a cooling jacket 26. Other common methods of cooling vessels may also be used, such as half pipes.

The enclosure 20 is spaced from the induction coils 110. This space between the enclosure 20 and the induction coils 110 is maintained in a neutral atmosphere. This neutral atmosphere is maintained by supplying an inert gas, such as nitrogen or argon into the system 10. The space between the induction coils 110 and the enclosure 20 is greater than the space between the induction coils 110 and the susceptor 72 to provide a greater coupling between the induction coils 110 and the susceptor 72 than the induction coils and the enclosure 20, which increases the efficiency of the system 10. In some embodiments, the diameter of the enclosure 20 is 1.25 to 4.0 times greater than the diameter of the coils 110.

In a method of producing polysilicon with system 10, an alternating electric current from each energy source 108 is supplied to the coils 110 of at least one zone 102 or sub-zone 104 to create an electromagnetic field about the coils. The magnetic field produces eddy currents in the conducting susceptor 72, which generate heat in the susceptor. The heat produced is dependent on the current that is passed through the coils 110.

The supply of alternating electric current from each energy source 108 is independent of the alternating electric current from another energy source. Thus, each zone 102 is controlled independently. The alternating electric current supplied to the coils 110 of one of the zones 102 or sub-zone 104 may be adjusted to increase or decrease the supplied alternating electric current, while maintaining the alternating electric current supplied to the coils of the other zones or sub-zones constant. As a result, the different zones or sub-zones, which may have uniform coil arrangements, produce different amounts of heat due to the different currents passing through each zone or sub-zone.

Systems of this disclosure are not limited to the production of polysilicon from silane. The system 10 may also be used for producing polysilicon from trichlorosilane (SiHCl$^3$). In addition, the system 10 is also suitable for dehydrogenation of polysilicon. A dehydrogenation process involves heating a fluidized bed of granular polysilicon to between about 1000° C. and about 1300° C. to remove the unwanted hydrogen from inside the granular polysilicon. A dehydrogenation operation is generally carried out at relatively lower pressure. Although the heat flux requirement is similar to the polysilicon production process, the temperature of the reactor wall 40 and susceptor 72 during dehydrogenation may be considerably higher due to high reactor temperature.

Numerical simulations using typical parameters for the system 10 having a large diameter high-pressure fluidized bed reactor are discussed below. Representative results of the simulations are shown in FIGS. 3-5.

Figure 3:
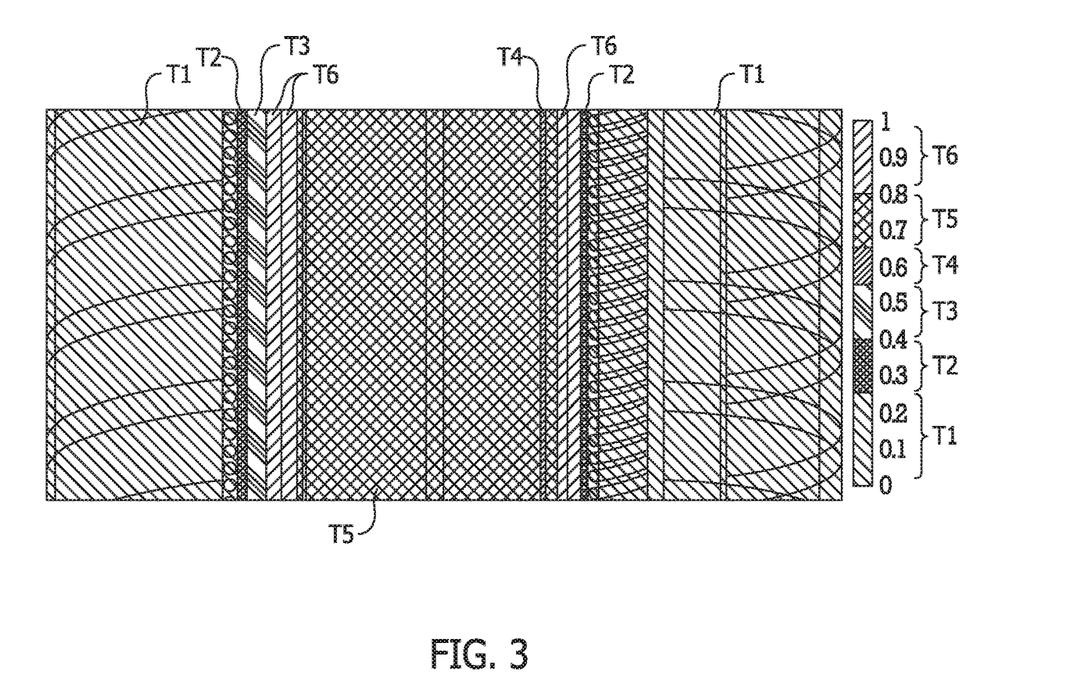
FIG. 3 is a partial cross sectional view of the induction heater system of FIG. 1 illustrating the temperature field it.

FIG. 3 shows the temperature field inside a section of the high-pressure fluidized bed reactor 30 heated with the inductive induction unit 100 discussed above. The results were generated using coupled electromagnetic and thermal numerical simulations. The temperature field shown is non-dimensionalized using a nominal temperature.

A heat flux of between about 50 KW/m$^2$ and about 150 KW/m$^2$ is shown to maintain the desired temperatures inside the reactor chamber 32. The system 10 has a high efficiency of 65%-90%. In some embodiments, the system 10 has an efficiency of 80%-90%. Energy efficiency is defined as energy fed to the process divided by energy consumed by the induction coils 110. The energy efficiency excludes the efficiency of the energy source.

Figure 4:
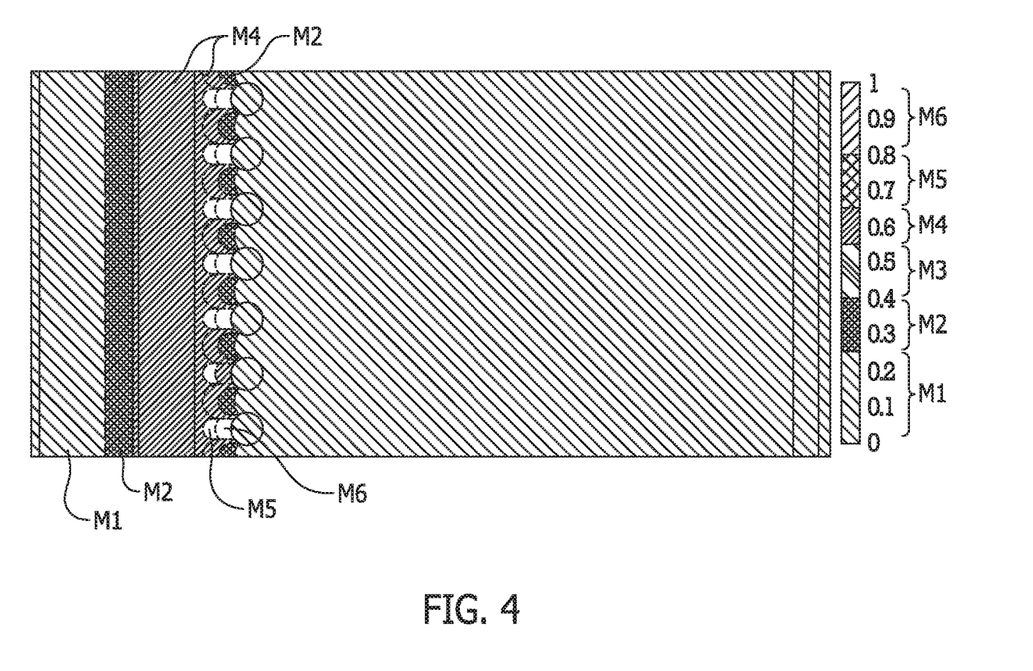
FIG. 4 is a partial cross sectional view of the induction heater system of FIG. 1 illustrating a 2D contour plot of magnetic flux density.
Figures 5A, 5B:
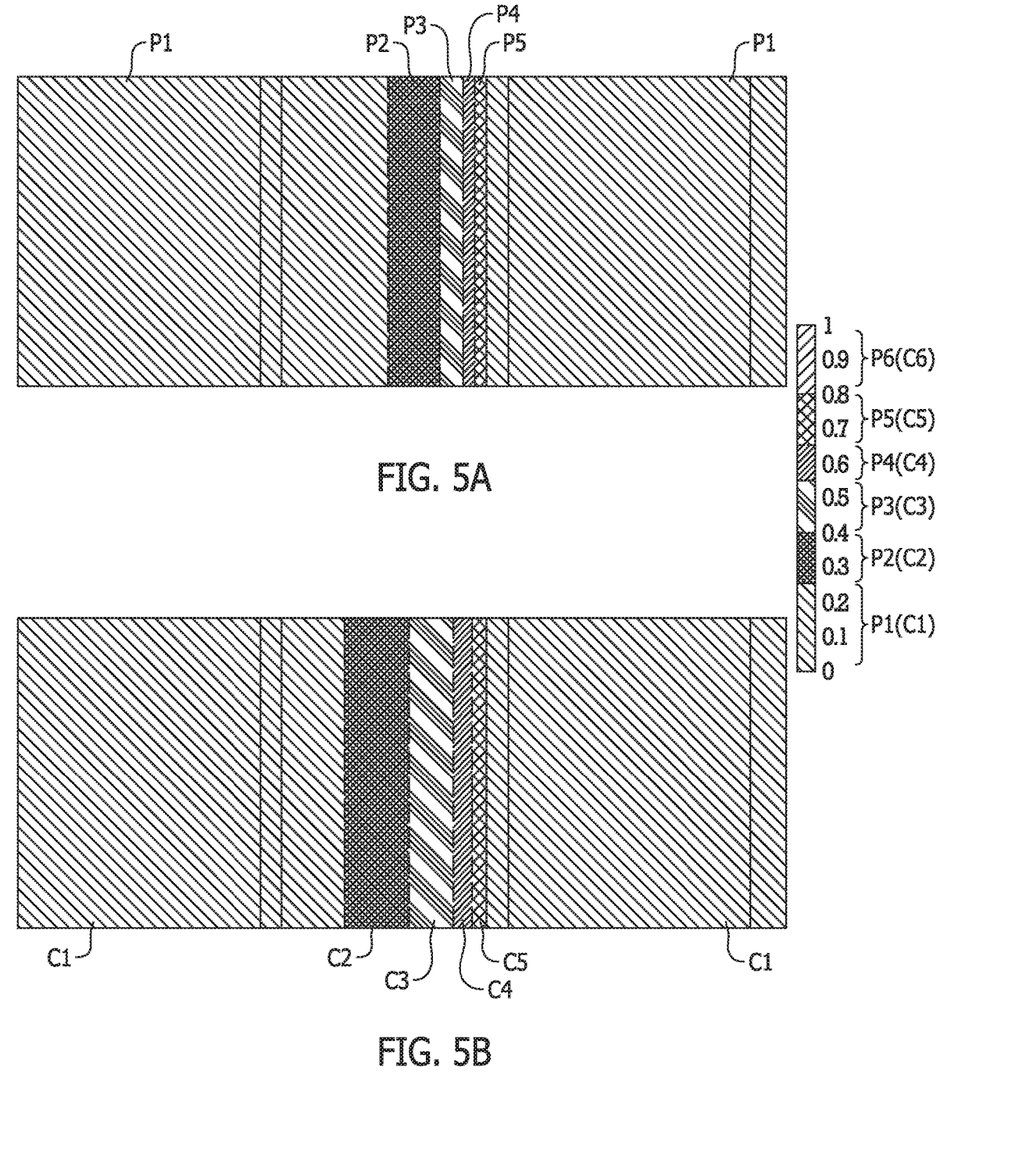
FIG. 5A is a partial cross sectional view of the induction heater system of FIG. 1 illustrating a 2D contour plot of induced power density.
FIG. 5B is a partial cross sectional view of the induction heater system of FIG. 1 illustrating a 2D contour plot of induced current density.

FIGS. 4, 5A, and 5B show a contour plot of magnetic flux density, induced power density, and induced current density inside the high-pressure fluidized bed reactor 30 during typical operation of the system 10. As shown by the plots, the susceptor 72 and the metallic enclosure 20 effectively mask the magnetic flux from penetrating inside the reactor wall 30 and from leaving the metallic enclosure 20. As a result, the system 10 is shown to function properly while ensuring process safety.

In addition, the plots show minimal induced currents inside the reactor wall 30. Therefore, most of the induced power is generated inside the susceptor 72. As shown, more than 97% of the heat was generated inside the susceptor.

FIG. 4 is a 2-dimensional contour plot of magnetic flux density inside the high-pressure fluidized bed reactor 30. The values are non-dimensionalized using a nominal value of magnetic flux density.

FIG. 5A is a 2-dimensional contour plot of induced power density and FIG. 5B is a 2-dimensional contour plot of induced current density inside the reactor wall 30, susceptor 72, and insulation body 80. The values are non-dimensionalized using a nominal value of induced power density and induced current density, respectively.

Use of systems and methods consistent with this disclosure provide efficient heating of high-pressure fluidized bed reactors. In addition, minimal magnetic flux penetrates inside the reactor wall 40 and outside the metallic enclosure 20. Furthermore, the devices are capable of generating heat fluxes of up to about 150 KW/m$^2$ at very high efficiencies, between about 80% and about 90%, during operation of the high-pressure fluidized bed reactor 30. The system 10 has a capacity for polysilicon production above 100 kg/hr per square meter of reactor chamber cross-section. In some embodiments, the system 10 has approximately 4000 kg/hr per square meter of reactor chamber cross-section capacity for polysilicon production.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the invention, it is intended that all matter contained in the above description and shown in the accompanying drawing[s] shall be interpreted as illustrative and not in a limiting sense.

What is claimed is:

1. A system for producing a polycrystalline silicon product, the system comprising:
   a fluidized bed reactor comprising:
      a reaction chamber having a reactor wall;
      a distributor having a plurality of openings connected with one or more sources of gas for supplying gas to the reaction chamber;
      a susceptor encircling the reactor wall;
      a withdrawal tube to remove granular polycrystalline silicon product from the reaction chamber; and
      an induction unit surrounding the susceptor, the induction unit having multiple induction coils for producing heat in the susceptor, the coils grouped into a plurality of zones; and
   a plurality of energy sources for supplying an electric current to the coils, each energy source connected with the coils of at least one zone, the energy sources being independently controllable to adjust an electric current supplied from each energy source to the coils connected to the energy source, the energy sources being independently controlled to reduce hotspots within the reactor wall of the fluidized bed reactor.

2. The system of claim 1, further comprising insulation between the induction unit and the susceptor for preventing heat loss from the susceptor to ambient.

3. The system of claim 1, wherein the reactor wall has a diameter of at least 20 inches.

4. The system of claim 1, wherein the coils of each zone being divided into multiple sub-zones, at least one sub-zone from each zone connected with the same energy source.

5. The system of claim 1, further comprising an enclosure surrounding the induction unit for masking a stray magnetic field generated by the coils.

6. A system for producing a polycrystalline silicon product, the system comprising:
   a fluidized bed reactor comprising:
      a reaction chamber having a reactor wall;
      a distributor having a plurality of openings connected with one or more sources of gas for supplying gas to the reaction chamber;
      a susceptor encircling the reactor wall; and
      an induction unit surrounding the susceptor, the induction unit having multiple induction coils for producing heat in the susceptor, the coils grouped into a plurality of zones, the coils having passages therethrough for circulating deionized water to cool the coils; and a plurality of energy sources for supplying an electric current to the coils, each energy source connected with the coils of at least one zone, the energy sources being independently controllable to adjust an electric current supplied from each energy source to the coils connected to the energy source, the energy sources being independently controlled to reduce hotspots within the reactor wall of the fluidized bed reactor.

7. The system of claim 6, wherein the coils of each zone are divided into multiple sub-zones, at least one sub-zone from each zone connected with the same energy source.

8. The system of claim 6, further comprising an enclosure surrounding the induction unit for masking a stray magnetic field generated by the coils.

9. A method for producing a polycrystalline silicon product in a fluidized bed reactor having multiple induction coils grouped into multiple zones and a plurality of energy sources and a susceptor, each of the plurality of energy sources connected with the coils of at least one zone, the method comprising:
supplying an inlet gas comprising a thermally decomposable compound into a reaction chamber of the fluidized bed reactor, the reaction chamber having a reactor wall;
depositing silicon from the thermally decomposable compound onto fluidized silicon seed particles or granular polycrystalline silicon;
supplying an electric current from each energy source to the coils of at least one zone to create an electromagnetic field about the coils;
independently controlling each energy source to adjust the supply of electric current from each energy source to the coils connected to the energy source, the energy sources being independently controlled to reduce hotspots within the reactor wall of the fluidized bed reactor;
producing eddy currents in the susceptor; and
generating heat in the susceptor.

10. The method of claim 9, wherein the supply of electric current from at least one energy source is controlled by increasing or decreasing the electric current supplied to the coils connected to the energy source.

11. The method of claim 9, wherein the supply of electric current from at least one energy source is controlled by maintaining a constant supply of the electric current to the coils connected to the energy source.

12. The method of claim 9, wherein the electric current ranges from about 1000 Amperes to about 3500 Amperes.

13. The method of claim 9, further comprising the step of producing a heat flux of between about 50 KW/m$^2$ and about 150 KW/m$^2$.

14. The method of claim 9, wherein the coils have passages therethrough for circulating deionized water to cool the coils.

15. The method of claim 14, further comprising the step of circulating deionized water through the passages to cool the coils.

16. The method of claim 9, further comprising the step of operating the reactor at an efficiency of between about 80% and about 90%.

17. The method of claim 9, further comprising discharging an exhaust gas through an outlet formed within a cap of the fluidized bed rector.

18. A system for producing a polycrystalline silicon product, the system comprising:
a fluidized bed reactor comprising:
a reaction chamber having a reactor wall;
a distributor having a plurality of openings connected with one or more sources of gas for supplying gas to the reaction chamber;
a susceptor encircling the reactor wall;
a cap having an outlet for evacuation of exhaust gas from the reaction chamber; and
an induction unit surrounding the susceptor, the induction unit having multiple induction coils for producing heat in the susceptor, the coils grouped into a plurality of zones; and
a plurality of energy sources for supplying an electric current to the coils, each energy source connected with the coils of at least one zone, the energy sources being independently controllable to adjust an electric current supplied from each energy source to the coils connected to the energy source, the energy sources being independently controlled to reduce hotspots within the reactor wall of the fluidized bed reactor.

19. The system of claim 18, wherein the coils of each zone are divided into multiple sub-zones, at least one sub-zone from each zone connected with the same energy source.

20. The system of claim 18, further comprising an enclosure surrounding the induction unit for masking a stray magnetic field generated by the coils.

* * * * *